April 28, 1931.  S. W. BROWN  1,802,591
PERCOLATOR ATTACHMENT
Filed Nov. 19, 1929
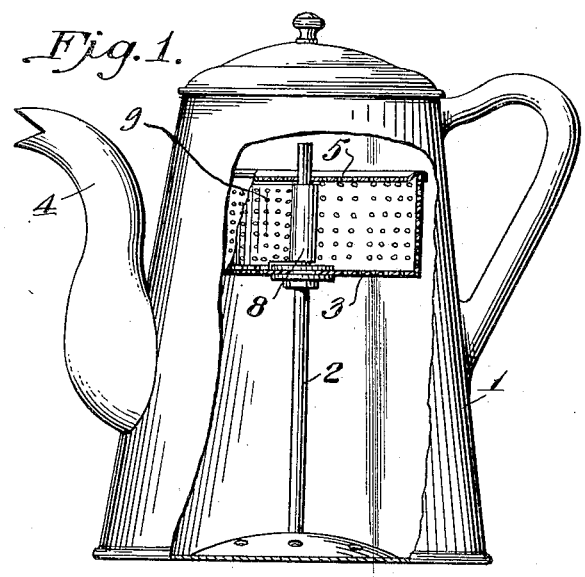
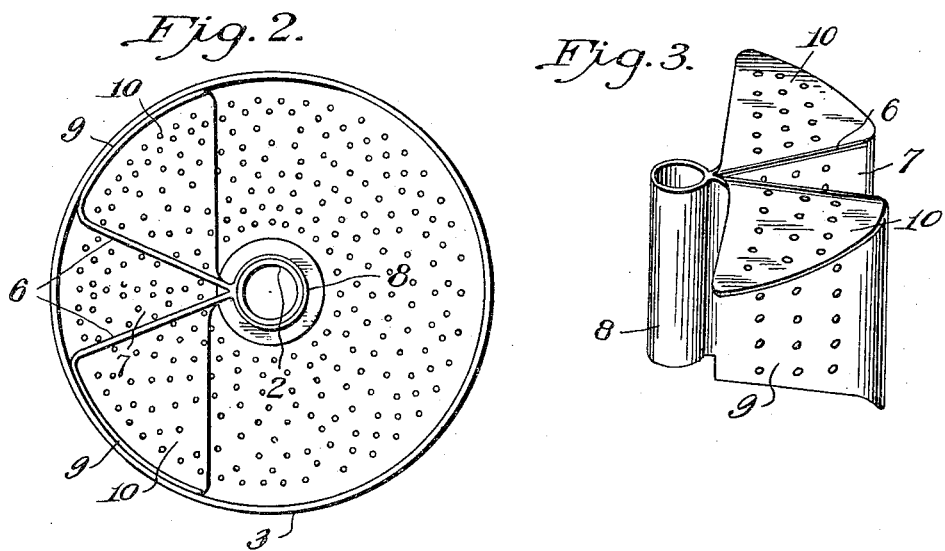
Inventor.
Sadie W. Brown Patented Apr. 28, 1931

1,802,591

UNITED STATES PATENT OFFICE

SADIE W. BROWN, OF VALLEJO, CALIFORNIA

PERCOLATOR ATTACHMENT

Application filed November 19, 1929. Serial No. 408,385.

This invention relates to domestic coffee percolators, my principal object being to provide a device, in the form of an attachment applicable to any standard percolator of this general character, by means of which not only is the coffee in the percolator receptacle held from the side on which the spout of the coffee-pot is located, but there is no danger of the coffee grounds clogging the entire perforated area of the receptacle as is often the case, and which causes the liquid during the percolating process, to run over the top of the receptacle and carry some of the grounds with it into the bottom of the pot, and prevent proper percolation of the liquid through the coffee. With my improved attachment, therefore, the percolating process is expedited and benefited, since as is well known proper and efficient percolation depends on a relatively free movement of the liquid through the coffee.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Fig. 1 is a side elevation of a percolator partly broken out, showing my improved coffee separating attachment in position in the coffee receptacle.

Fig. 2 is a top plan view of the receptacle showing the separator therein.

Fig. 3 is a bottom perspective view of the separator.

Referring now more particularly to the characters of reference on the drawings, the numeral 1 denotes the body or pot of a coffee percolator of ordinary character having an upstanding percolating tube 2 therein, which is open on top and bottom as usual and which supports the coffee receptacle 3 toward its upper end or about on a level with the top junction of the spout 4 with the body. A perforated disc 5 is removably mounted on top of the receptacle as is customary, to better distribute the liquid flowing from the top of the tube 2 (which is above the disc) over the entire area of the receptacle.

My coffee separating attachment, which is mounted in connection with the standard structure above described, is preferably made of sheet aluminum, and stamped out of a single piece of the metal. Said metal comprises a pair of vertical walls 6 arranged in diverging relation to each other so as to form a V-shaped opening 7 therebetween. Said walls are provided at their adjacent or converged ends with a vertical sleeve 8 adapted to slip over the portion of the tube 2 within the receptacle and under the disc 5. Said walls therefore are disposed in radiating relation to the tube and to the axis of the receptacle and the attachment is preferably positioned so that said opening 7 is on the same side of the receptacle as that on which the spout 4 is located. Said walls 6 extend so as to terminate close to the inner periphery of the receptacle and at their outer ends they are formed with extensions 9, which project away from each other and are curved concentric with the receptacle. These extensions are arranged so as to fit fairly close to the inner periphery of the receptacle so as to prevent coffee getting past the side edges of the walls 6 and into the space or opening 7. Perforated bottom walls 10 preferably extend between the walls 6 and the extensions 9 so as to stiffen the parts against deflection, said bottom walls of course resting on the bottom of the receptacle 3 when the attachment is in position in said receptacle.

As will be evident from the above description the attachment forms a partition means dividing the area of the coffee receptacle into relatively large and small sectors, the coffee being placed only in the larger sector, and thus leaving the area of the small sector unoccupied by coffee, so that the corresponding portions of the perforated bottom and side walls of the receptacle will freely open at all times. Due to this arrangement therefore the percolating process is helped and expedited, since the liquid as discharged through the disc 5 into the receptacle below, finds an easy escape at all times (if the coffee clogs the perforations of the portion of the receptacle walls in which said coffee is confined) through the walls 6 and into the opening 7. Said liquid can then freely flow down into the bottom of the pot through the unobstructed receptacle perforations enclosed within the space or opening 7 between the walls 6. Also said space being adjacent the plane of the spout, when the pot is tilted to pour the coffee there is no chance for the grounds shifting to the adjacent side of the receptacle and possibly spilling over the top edge of the same and mingling with the liquid being poured.

From the foregoing description it will be readily seen that I have produced such a device as will substantially fulfill the objects of the invention as set forth herein.

While I have described the present and preferred construction of the device, still in practice such deviations therefrom may be resorted to as do not form a departure from the spirit of the invention, as defined by the appended claims.

Having thus described my invention what I claim as new and useful and desire to secure by Letters Patent is:

1. An attachment for the coffee receptacle of a percolator comprising vertical partition means to divide the area of the receptacle into relatively large and small sectors, and a vertical sleeve fixed with the partition means for removable engagement with the percolating tube of the percolator.

2. An attachment for the coffee receptacle of a percolator comprising vertical partition means to divide the area of the receptacle into relatively large and small sectors, said partition means comprising foraminous walls diverging from each other so as to extend radially of the receptacle, and a sleeve formed with said walls at their converged ends for removable engagement with the percolating tube of the percolator.

3. A structure as in claim 2, with extensions projecting in opposite directions from the outer ends of the walls and curved concentric with the receptacle and so as to lie close against the inner periphery thereof.

In testimony whereof I affix my signature.

SADIE W. BROWN.